United States Patent Office 2,819,242
Patented Jan. 7, 1958

2,819,242

REACTION PRODUCTS OF CERTAIN CARBOXYLATED PHENOL-ALDEHYDE RESINS AND CERTAIN AMINE-MODIFIED PHENOL-ALDEHYDE RESINS AND METHOD OF PREPARING SAME

Melvin De Groote, University City, Mo., assignor to Petrolite Corporation, Wilmington, Del., a corporation of Delaware No Drawing. Application December 3, 1953
Serial No. 396,079

20 Claims. (Cl. 260—43)

The present invention is concerned with processes involving reactions between certain amine-modified phenol-aldehyde resins and certain carboxylated resins. Furthermore, it is concerned with the products so obtained and their uses in various arts.

U. S. Patent No. 2,571,118, dated October 16, 1951, to De Groote and Keiser, describes a fusible, carboxyl-containing, xylene-soluble, water-insoluble, low-stage phenol-aldehyde resin; said resin being derived by reaction between a mixture of a difunctional monohydric hydrocarbon-substituted phenol and salicyclic acid on the one hand, and an aldehyde having not over 8 carbon atoms and having one functional group reactive toward both components of the mixture on the other hand; the amount of salicylic acid employed in relation to the non-carboxylated phenol being sufficient to contribute at least one salicylic acid radical per resin molecule and the amount of difunctional monohydric hydrocarbon-substituted phenol being sufficient to contribute at least one difunctional monohydric hydrocarbon-substituted phenol radical per molecule; said resin being formed in the substantial absence of phenols of functionality greater than two, and said phenol being of the formula

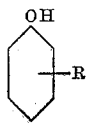

in which R is a hydrocarbon radical having at least 4 and not more than 14 carbon atoms and substituted in one of the positions ortho and para.

More specifically, the present invention is concerned with the reaction between said carboxylated resins above described and certain amine-modified thermoplastic phenol-aldehyde resins; such amine-modified resins have been described in various patent applications as, for example, in my co-pending application, Serial No. 288,-745, filed May 19, 1952, now abandoned. A typical claim is as follows:

"The process of condensing (a) an oxyalkylation-susceptible, fusible, non-oxygenated organic solvent-soluble, water-insoluble, low-stage phenol-aldehyde resin having an average molecular weight corresponding to at least 3 and not over 6 phenolic nuclei per resin molecule; said resin being difunctional only in regard to methylol-forming reactivity; said resin being derived by reaction between a difunctional monohydric phenol and a aldehyde having not over 8 carbon atoms and reactive toward said phenol; said resin being formed in the substantial absence of trifunctional phenols; said phenol being of the formula

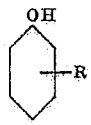

in which R is an aliphatic hydrocarbon radical having at least 4 and not more than 24 carbon atoms and substituted in the 2, 4, 6 position; (b) a basic hydroxylated polyamine having at least on secondary amino group and having not over 32 carbon atoms in any radical attached to any amino nitrogen atom, and with the further proviso that the polyamine be free from any primary amino radical, any substituted imidazoline radical, and any substituted tetrahydropyrimidine radical; and (c) formaldehyde; said condensation reaction being conducted at a temperature sufficiently high to eliminate water and below the pyrolytic point of the reactants and resultants of reaction; an dwith the proviso that the resinous condensation product resulting from the process be heat-stable and oxyalkylation-susceptible.

The carboxylated phenol-aldehyde resins above described generally contain one or more carboxyl radicals, and generally one or two carboxyl radicals. The amine-modified phenol-aldehyde resins above described invariably have at least two alkanol radicals and may have more. Thus, the two types of reactants readily can form the equivalent of amides, esters, ester amides and particularly linear polymers dependent on such linkages.

More specifically then the present invention is concerned with an acylation process involving (A) a carboxylated resin, said carboxylated resin being a fusible, carboxyl-containing xylene-soluble, water-insoluble, low-stage phenol-aldehyde resin, said resin being derived by reaction between a mixture of a difunctional monohydric hydrocarbon-substituted phenol and salicylic acid on the one hand, and an aldehyde having not over 8 carbon atoms and having one functional group reactive toward both components of the mixture on the other hand; the amount of salicylic acid employed in relation to the non-carboxylated phenol being sufficient to contribute at least one salicylic acid radical per resin molecule and the amount of difunctional monohydric hydrocarbon-substituted phenol being sufficient to contribute at least one difunctional monohydric hydrocarbon-substituted phenol radical per molecule; said resin being formed in the substantial absence of phenols of functionality greater than two, and said phenol being of the formula

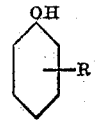

in which R is a hydrocarbon radical having at least 4 and not more than 14 carbon atoms and substiuted in one of the positions ortho and para; and (B) an amine-modified phenol-aldehyde resin; said amine-modified resin being obtained by the process of condensation of (a) an oxyalkylation-susceptible, fusible, non-oxygenated organic solvent-soluble, water-insoluble, low-stage phenol-aldehyde resin having an average molecular weight corresponding to at least 3 and not over 6 phenolic nuclei per resin molecule; said resin being difunctional only in regard to methylol forming reactivity; said resin being derived by reaction between a difunctional monohydric phenol and an aldehyde having not over 8 carbon atoms and reactive toward said phenol; said resin being formed in the substantial absence of phenols of functionality greater than 2; said phenol being of the formula

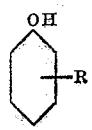

in which R is an aliphatic hydrocarbon radical having at least 4 and not more than 24 carbon atoms and substituted in the 2,4,6 position; (b) a basic hydroxylated polyamine having at least one secondary amino group and having not over 32 carbon atoms in any radical attached to any amino nitrogen atom, and with the further proviso that the polyamine be free from any primary amino radical, any substituted imidazoline radical, and any substituted tetrahydropyrimidine radical; and (c) formaldehyde; said condensation reaction being conducted at a temperature sufficiently high to eliminate water and below the pyrolytic point of the reactants and resultants of reaction; with the proviso that the condensation reaction be conducted so as to produce a significant portion of the resultant in which each of the three reactants have contributed part of the ultimate molecule by virtue of a formaldehyde-derived methylene bridge connecting the amino nitrogen atom with a resin molecule; with the further proviso that the ratio of reactants be approximately 1, 2 and 2, respectively; and with the final proviso that the resinous condensation product resulting from the process be heat-stable and oxyalkylation-susceptible; said acylation reaction being conducted at a temperature sufficiently high to eliminate water of formation and below the pyrolytic point of the reactants and products of reaction.

Furthermore, the present invention is concerned with the products obtained by the acylation process described immediately preceding.

For purpose of convenience, what is said hereinafter will be divided into six parts:

Part 1 is concerned with the preparation of the carboxylated resins;

Part 2 is concerned with the phenol-aldehyde resin which is subjected to modification by condensation reaction to yield an amine-modified resin;

Part 3 is concerned with appropriate basic hydroxylated secondary polyamines which may be employed in the preparation of the herein-described amine-modified resins;

Part 4 is concerned with reactions involving the resin, the amine, and formaldehyde to produce specific products or compounds;

Part 5 is concerned with the acylation or esterification reaction involving the carboxylated resins on the one hand and the amine-modified resins on the other hand; and Part 6 is concerned with uses for the products described in Part 5, preceding.

PART 1

U. S. Patent No. 2,571,118, dated October 16, 1951, to De Groote and Keiser, describes a fusible, carboxyl-containing, xylene-soluble, water-insoluble, low-stage phenolaldehyde resin; said resin being derived by reaction between a mixture of a difunctional monohydric hydrocarbon-substituted phenol and salicylic acid on the one hand, and an aldehyde having not over 8 carbon atoms and having one functional group reactive toward both components of the mixture on the other hand; the amount of salicylic acid employed in relation to the non-carboxylated phenol being sufficient to contribute at least one salicylic acid radical per resin molecule and the amount of difunctional monohydric hydrocarbon-substituted phenol being sufficient to contribute at least one difunctional monohydric hydrocarbon-substituted phenol radical per molecule; said resin being formed in the substantial absence of phenols of functionality greater than two, and said phenol being of the formula:

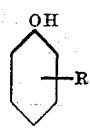

in which R is a hydrocarbon radical having at least 4 and not more than 14 carbon atoms and substituted in one of the positions ortho and para.

The present invention is concerned with the use of such carboxyl-containing resins obtained from a reactant mixture in which 1 to 2 moles of salicylic acid are used in conjunction with 3 to 5 moles of a substituted phenol as described. In most instances the preferred mixture involves a 3:2 or 4:1 molal ratio of substituted phenol to salicylic acid.

Assuming one used 4 moles of amylphenol and one mole of salicylic acid, the resin in its simplest aspect may be represented in an idealized form in the following manner:

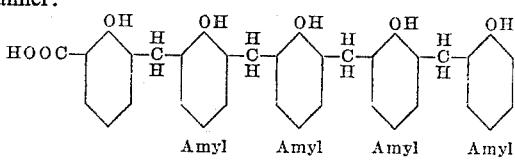

The above formula is, of course, an idealized structure, for obvious reasons, because the salicylic acid nucleus presumably can appear at any point in the resin molecule. Such resin, or for that matter, a resin having an increased number of salicylic acid radicals, can be oxyalkylated in the same manner as other phenol-aldehyde resins.

If obtained from 2 moles of salicylic acid and 3 moles of amylphenol the corresponding idealized formula would be thus:

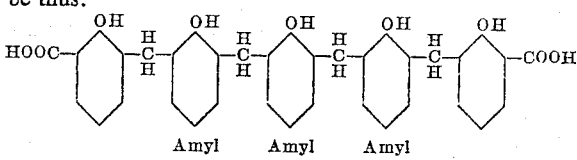

As to the preparation of such resins, purely by way of illustration certain examples are repeated substantially in verbatim form as they appear in said aforementioned U. S. Patent No. 2,571,118. In said patent there is reference to an example which illustrates resinification without use of salicylic acid. For continuity of text this example obviously is included.

Example 1aa

| | Grams |
|---|---|
| Para-tertiary butylphenol | 150 |
| Formaldehyde, 37% | 81 |
| Concentrated HCl | 1.5 |
| Monoalkyl ($C_{10}$–$C_{20}$, principally $C_{12}$–$C_{14}$ benzene monosulfonic acid sodium salt) | 0.8 |
| Xylene | 100 |

Examples of alkylaryl acids which serve as catalysts and as emulsifiers particularly in the form of sodium salts, include the following

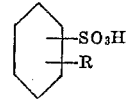

R is an alkyl hydrocarbon radical having 12–14 carbon atoms.

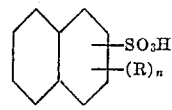

R is an alkyl radical having 3–12 carbon atoms and $n$ represents the numeral 3, 2, or 1, usually 2, in such instances where R contains less than 8 carbon atoms.

With respect to alkylaryl sulfonic acids or the sodium salts, we have employed a monoalkylated benzene monosulfonic acid or the sodium salt thereof, wherein the alkyl group contains 10 to 14 carbon atoms. I have found equally effective and interchangeable the following specific sulfonic acids, or their sodium salts. A mixture of di- and tripropylated naphthalene monosulfonic acid; diamylated naphthalene monosulfonic acids; and nonyl naphthalene monosulfonic acid.

The equipment used was a conventional two-piece laboratory resin pot. The cover part of the equipment had four openings; one for reflux condenser, one for the stirring device; one for a separatory funnel or other means of adding reactants; and a thermometer well. In the manipulation employed the separatory funnel insert for ading reactants was not used. The device was equipped with a combination reflux and water-trap apparatus, so that the single piece of equipment could be used as either a reflux condenser or a water trap, depending upon the position of the three-way glass stop-cocks. This permitted convenient withdrawal of water from the water trap. The equipment, furthermore, permitted any setting of the valve without disconnecting the equipment. The resin pot was heated with a glass fibre electrical heater constructed to fit snugly around the resin pot. Such heaters, with regulators, are readily available.

The phenol, formaldehyde, acid catalyst, and solvent were combined in the resin pot, above described. This particular phenol was in the form of a flaked solid. Heat was applied, with gentle stirring, and the temperature was raised to 80–85° C., at which point a mild exothermic reaction took place. This reaction raised the temperature to approximately 105–110° C. The reaction mixture was then permitted to reflux at 100–105° C. for between one and one-and-one-half hours. The reflux trap arrangement was then changed from the reflux position to the normal water entrapment position. The water of solution and the water of reaction were permitted to distill out and collect in the trap. As the water distilled out, the temperature gradually increased to approximately 150° C. which required between 1.5 to 2 hours. At this point the water recovered in the trap, after making allowance for a small amount of water held up in the solvent, corresponded to the expected quantity.

The solvent solution so obtained was used as such in subsequent oxyalkylation steps. I have removed also the solvent by conventional means, such as evaporation, distillation, or vacuum distillation, and I customarily take a small sample of the solvent solution and evaporate the solvent to note the characteristics of the solvent-free resin. The resin obtained in the operation above described was clear, light amber colored, hard, brittle, and had a melting point of 160–165° C.

Attention is directed to the fact that tertiary butylphenol in presence of a strong mineral acid as a catalyst and using formaldehyde, sometimes yields a resin which apparently has a very slight amount of cross-linking. Such resin is similar to the one described above, except that it is sometimes opaque, and its melting point is higher than the one described above and there is a tendency to cure. Such a resin generally is dispersible in xylene but not soluble to give a clear solution. Such dispersion can be oxyalkylated in the same manner as the clear resin. If desired, a minor proportion of another and inert solvent, such as diethyleneglycol diethylether, may be employed along with xylene, to give a clear solution prior to oxyalkylation. This fact of solubilization shows the present resin molecules are still quite small, as contrasted with the very large size of extensively cross-linked resin molecules. If, in following a given procedure with a given lot of the phenol, such a resin is obtained, the amount of catalyst employed is advantageously reduced slightly, or the time of reflux reduced slightly, or both, or an acid such as oxalic acid is used instead of hydrochloric acid. Purely as a matter of convenience due to better solubility in xylene, we prefer to use a clear resin, but if desired, either type may be employed. (See Example 1a of aforementioned Patent No. 2,571,118.)

*Example 2aa*

Para-tertiary nonylphenol (3.0 moles) ___grams__ 660
Salicylic acid (2.0 moles) _____do____ 276
Formaldehyde 37% (5.0 moles) _____do____ 405
Xylene _____do____ 700
HCl (concentrated) _____ml__ 40
Dodecyl toluene monosulfonic acid sodium salt _____grams__ 3

The same procedure was followed as in Example 1aa, preceding, except that the reflux period was 5 hours, instead of 1½ hours. Also, note the marked increase in amount of acid used as a catalyst in this instance.

The resin solution so obtained contained approximately 41.2% xylene.

The solvent-free resin was pale reddish amber in color, xylene-soluble, clear, and quite soft in consistency. (See Example 18a of aforementioned Patent 2,571,118.)

*Example 3aa*

Para-tertiary amylphenol (4.0 moles) _____grams__ 656
Salicylic acid (1.0 mole) _____do____ 138
Formaldehyde 37% (5.0 moles) _____do____ 405
Xylene _____do____ 700
HCl (concentrated) _____ml__ 40
Dodecyl toluene monosulfonic acid sodium salt _____grams__ 3

The same procedure was followed as in Example 1aa, preceding, except that the reflux period was 5 hours, instead of 1½ hours. Also, note the marked increase in amount of acid used as a catalyst in this instance.

The resin solution so obtained, contained approximately 45% xylene. The solvent-free resin was reddish amber in color, slightly opaque, obviously xylene-soluble, and somewhat hard to pliable in consistency. (See Example 7a of aforementioned Patent 2,571,118.)

*Example 4aa*

Para-tertiary amylphenol (3.0 moles) _____grams__ 492
Salicylic acid (2.0 moles) _____do____ 276
Formaldehyde 37% (5.0 moles) _____do____ 405
Xylene _____do____ 700
HCl (concentrated) _____ml__ 40
Dodecyl toluene monosulfonic acid sodium salt _____grams__ 3

The same procedure was followed as in Example 1aa, preceding, except that the reflux period was 5 hours, instead of 1½ hours. Also, note the marked increase in amount of acid used as a catalyst in this instance.

The resin solution so obtained contained approximately 48.8% xylene. The solvent-free resin was reddish amber in color, clear, xylene-soluble and semi-soft or pliable in consistency. (See Example 13a of aforementioned Patent 2,571,118.)

*Example 5aa*

Para-secondary butylphenol (3.0 moles) ___grams__ 450
Salicylic acid (2.0 moles) _____do____ 276
Formaldehyde 37% (5.0 moles) _____do____ 405
HCl (concentrated) _____ml__ 40
Xylene _____grams__ 700
Dodecyl toluene monosulfonic acid sodium salt _____do____ 3

The same procedure was followed as in Example 1aa, preceding, except that the reflux period was 5 hours, instead of 1½ hours. Also, note the marked increase in amount of acid used as a catalyst in this instance.

The resin solution, so obtained, contained approximately 44.2% xylene. The solvent-free resin was amber in color, slightly opaque, almost entirely soluble in xylene, and fairly hard or pliable in consistency. (See Example 14a of aforementioned Patent 2,571,118.)

*Example 6aa*

Para-octylphenol (3.0 moles) _____grams__ 618
Salicylic acid (2.0 moles) _____do____ 276
Formaldehyde 37% _____do____ 405
Xylene _____do____ 700
HCl (concentrated) _____ml__ 40
Dodecyl toluene monosulfonic acid sodium salt _____grams__ 3

The same procedure was followed as in Example 1aa, preceding, except that the reflux period was 5 hours instead of 1½ hours. Also, note the marked increase in amount of acid used as a catalyst in this instance.

The resin solution, so obtained, contained approximately 42.3% xylene. The solvent-free resin was clear, reddish amber in color, xylene-soluble, and semi-hard to pliable in consistency. (See Example 16a of aforementioned Patent 2,571,118.)

*Example 7aa*

| | Grams |
|---|---|
| Para-tertiary amylphenol (4.0 moles) | 656 |
| Salicylic acid (1.0 mole) | 138 |
| Propionaldehyde (5.0 moles) | 305 |
| Xylene | 700 |
| Concentrated sulfuric acid | 20 |

Whenever propionaldehyde or similar aldehydes were employed the procedure was changed slightly from that employed in Example 1aa. The equipment employed, however, was the same. The amylphenol, salicylic acid, xylene and acid catalyst were combined in the resin pot, stirred and heated to 150° C. At this point the propionaldehyde was added slowly for about 1½ hours, after which the whole reaction mass was permitted to reflux for 5 hours at the reflux temperature of water or slightly above, i. e., 100°–110° C., before distilling out water. The amount of water distilled out was 102 cc.

The resin solution so obtained contained approximately 41.2% xylene. The solvent-free resin was reddish-black, clear, xylene-soluble and hard but not brittle in consistency.

(See Example 19a of aforementioned U. S. Patent No. 2,571,118.)

PART 2

It is well known that one can readily purchase on the open market, or prepare, fusible, organic solvent-soluble, water-insoluble resin polymers of a composition approximated in an idealized form by the formula

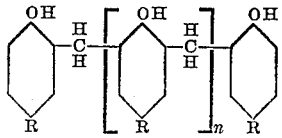

In the above formula $n$ represents a small whole number varying from 1 to 6, 7 or 8, or more, up to probably 10 or 12 units, particularly when the resin is subjected to heating under a vacuum as described in the literature. A limited sub-genus is in the instance of low molecular weight polymers where the total number of phenol nuclei varies from 3 to 6, i. e., $n$ varies from 1 to 4; R represents an aliphatic hydrocarbon substituent, generally an alkyl radical having from 4 to 15 carbon atoms, such as a butyl, amyl, hexyl, decyl or dodecyl radical. Where the divalent bridge radical is shown as being derived from formaldehyde it may, of course, be derived from any other reactive aldehyde having 8 carbon atoms or less.

Because a resin is organic solvent-soluble does not mean it is necessarily soluble in any organic solvent. This is particularly true where the resins are derived from trifunctional phenols as previously noted. However, even when obtained from a difunctional phenol, for instance, para-phenylphenol, one may obtain a resin which is not soluble in a nonoxygenated solvent, such as benzene, or xylene, but requires an oxygenated solvent such as a low molal alcohol, dioxane or diethyleneglycol diethylether. Sometimes a mixture of the two solvents (oxygenated and non-oxygenated) will serve. See Example 9a of U. S. Patent No. 2,499,365, dated March 7, 1950, to De Groote and Keiser.

The resins herein employed as raw materials must be soluble in a nonoxygenated solvent, such as benzene or xylene. This presents no problem insofar that all that is required is to make a solubility test on commercially available resins, or else prepare resins which are xylene or benzene-soluble as described in aforementioned U. S. Patent No. 2,499,365, or in U. S. Patent No. 2,499,368, dated March 7, 1950, to De Groote and Keiser. In said patent there are described oxyalkylation susceptible, fusible, nonoxygenated-organic solvent-soluble, water-insoluble, low-stage phenolaldehyde resins having an average molecular weight corresponding to at least 3 and not over 6 phenolic nuclei per resin molecule; said resin being difunctional only in regard to methylol-forming reactivity; said resin being derived by reaction between a difunctional monohydric phenol and an adehyde having not over 8 carbon atoms and reactive toward said phenol; said resin being formed in the substantial absence of trifunctional phenols; said phenol being of the formula

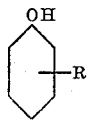

in which R is an aliphatic hydrocarbon radical having at least 4 carbon atoms and not more than 24 carbon atoms, and substituted in the 2,4,6 position;

If one selected a resin of the kind just described previously and reacted approximately one mole of the resin with two moles of formaldehyde and two moles of a basic nonhydroxylated secondary amine as specified, following the same idealized over-simplification previously referred to, the resultant product might be illustrated thus:

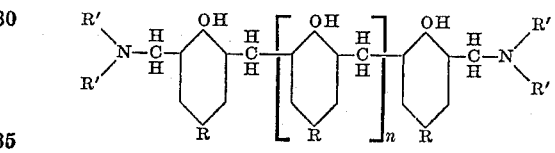

The basic hydroxylated amine may be designated thus:

In conducting reactions of this kind one does not necessarily obtain a hundred percent yield for obvious reasons. Certain side reactions may take place. For instance, 2 moles of amine may combine with one mole of the aldehyde, or only one mole of the amine may combine with the resin molecule, or even to a very slight extent, if at all, 2 resin units may combine without any amine in the reaction product, as indicated in the following formulas:

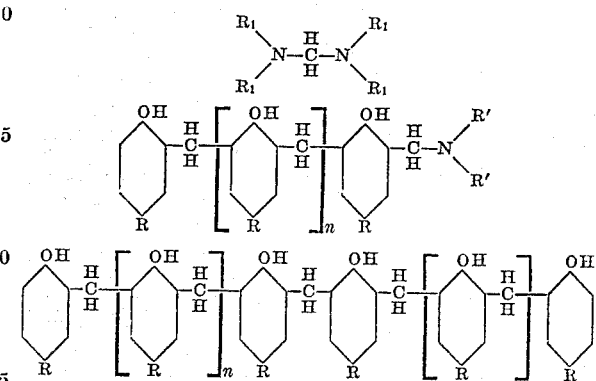

As has been pointed out previously, as far as the resin unit goes one can use a mole of aldehyde other than formaldehyde, such as acetaldehyde, propionaldehyde or butyraldehyde. The resin unit may be exemplified thus:

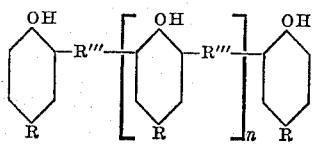

in which R''' is the divalent radical obtained from the particular aldehyde employed to form the resin. For reasons which are obvious the condensation product obtained appears to be described best in terms of the method of manufacture.

As previously stated the preparation of resins, the kind herein employed as reactants, is well known. See previously mentioned U. S. Patent 2,499,368. Resins can be made using an acid catalyst or basic catalyst or a catalyst having neither acid nor basic properties in the ordinary sense or without any catalyst at all. It is preferable that the resins employed be substantially neutral. In other words, if prepared by using a strong acid as a catalyst such strong acid should be neutralized. Similarly, if a strong base is used as a catalyst it is preferable that the base be neutralized although we have found that sometimes the reaction described proceeded more rapidly in the presence of a small amount of a free base. The amount may be as small as a 200th of a percent and as much as a few 10ths of a percent. Sometimes moderate increase in caustic soda and caustic potash may be used. However, the most desirable procedure in practically every case is to have the resin neutral.

In preparing resins one does not get a single polymer, i. e., one having just 3 units, or just 4 units, or just 5 units, or just 6 units, etc. It is usually a mixture; for instance, one approximating 4 phenolic nuclei will have some trimer and pentamer present. Thus, the molecular weight may be such that it corresponds to a fractional value for $n$ as, for example, 3.5, 4.5 or 5.2.

In the actual manufacture of the resins I found no reason for using other than those which are lowest in price and most readily available commercially. For purposes of convenience suitable resins are characterized in the following table:

TABLE I

| Example number | R | Position of R | R''' derived from— | $n$ | Mol. wt. of resin molecule (based on $n+2$) |
|---|---|---|---|---|---|
| 1a | Phenyl | Para | Formaldehyde | 3.5 | 992.5 |
| 2a | Tertiary butyl | do | do | 3.5 | 882.5 |
| 3a | Secondary butyl | Ortho | do | 3.5 | 882.5 |
| 4a | Cyclohexyl | Para | do | 3.5 | 1,025.5 |
| 5a | Tertiary amyl | do | do | 3.5 | 959.5 |
| 6a | Mixed secondary and tertiary amyl | Ortho | do | 3.5 | 805.5 |
| 7a | Propyl | Para | do | 3.5 | 805.5 |
| 8a | Tertiary hexyl | do | do | 3.5 | 1,036.5 |
| 9a | Octyl | do | do | 3.5 | 1,190.5 |
| 10a | Nonyl | do | do | 3.5 | 1,267.5 |
| 11a | Decyl | do | do | 3.5 | 1,344.5 |
| 12a | Dodecyl | do | do | 3.5 | 1,498.5 |
| 13a | Tertiary butyl | do | Acetaldehyde | 3.5 | 945.5 |
| 14a | Tertiary amyl | do | do | 3.5 | 1,022.5 |
| 15a | Nonyl | do | do | 3.5 | 1,330.5 |
| 16a | Tertiary butyl | do | Butyraldehyde | 3.5 | 1,071.5 |
| 17a | Tertiary amyl | do | do | 3.5 | 1,148.5 |
| 18a | Nonyl | do | do | 3.5 | 1,456.5 |
| 19a | Tertiary butyl | do | Propionaldehyde | 3.5 | 1,008.5 |
| 20a | Tertiary amyl | do | do | 3.5 | 1,085.5 |
| 21a | Nonyl | do | do | 3.5 | 1,393.5 |
| 22a | Tertiary butyl | do | Formaldehyde | 4.2 | 996.6 |
| 23a | Tertiary amyl | do | do | 4.2 | 1,083.4 |
| 24a | Nonyl | do | do | 4.2 | 1,430.6 |
| 25a | Tertiary butyl | do | do | 4.8 | 1,094.4 |
| 26a | Tertiary amyl | do | do | 4.8 | 1,189.6 |
| 27a | Nonyl | do | do | 4.8 | 1,570.4 |
| 28a | Tertiary amyl | do | do | 1.5 | 604.0 |
| 29a | Cyclohexyl | do | do | 1.5 | 646.0 |
| 30a | Hexyl | do | do | 1.5 | 653.0 |
| 31a | do | do | Acetaldehyde | 1.5 | 688.0 |
| 32a | Octyl | do | do | 1.5 | 786.0 |
| 33a | Nonyl | do | do | 1.5 | 835.0 |
| 34a | Octyl | do | Butyraldehyde | 2.0 | 986.0 |
| 35a | Nonyl | do | do | 2.0 | 1,028.0 |
| 36a | Amyl | do | do | 2.0 | 860.0 |
| 37a | Butyl | do | Formaldehyde | 2.0 | 636.0 |
| 38a | Amyl | do | do | 2.0 | 692.0 |
| 39a | Hexyl | do | do | 2.0 | 748.0 |
| 40a | Cyclohexyl | do | do | 2.0 | 740.0 |

PART 3

As has been pointed out, the amine herein employed as a reactant is a hydroxylated basic polyamine and preferably a strongly basic polyamine having at least one secondary amino radical, free from primary amino groups, free from substituted imidazoline groups, and free from substituted tetrahydropyrimidine groups, in which the hydrocarbon radicals present, whether monovalent or divalent are alkyl, alkylcyclic, arylalkyl, or heterocyclic in character, subject of course to the inclusion of a hydroxyl group attached to a carbon atom which in turn is part of a monovalent or divalent radical.

Previous reference has been made to a number of polyamines which are satisfactory for use as reactants in the instant condensation procedure. They can be obtained by hydroxylation of low cost polyamines. The cheapest amines available are polyethylene amines and polypropylene amines. In the case of the polyethylene amines there may be as many as 5, 6 or 7 nitrogen atoms. Such amines are susceptible to terminal alkylation or the equivalent, i. e., reactions which convert the terminal primary amino group or groups into a secondary or tertiary amine radical. In the case of polyamines having at least 3 nitrogen atoms or more, both terminal groups could be converted into tertiary groups, or one terminal group could be converted into a tertiary group and the other into a secondary amine group. In the same way, the polyamines can be subjected to hydroxylakylation by reaction with ethylene oxide, propylene oxide, glycide, etc. In some instances, depending on the structure, both types of reaction may be employed, i. e., one type to introduce a hydroxy ethyl group, for example, and another type to introduce a methyl or ethyl radical.

By way of example the following formulas are included. It will be noted they include such polyamines which, instead of being obtained from ethylene dichloride, propylene dichloride, or the like, are obtained from dichloroethyl ethers in which the divalent radical has a carbon atom chain interrupted by an oxygen atom:

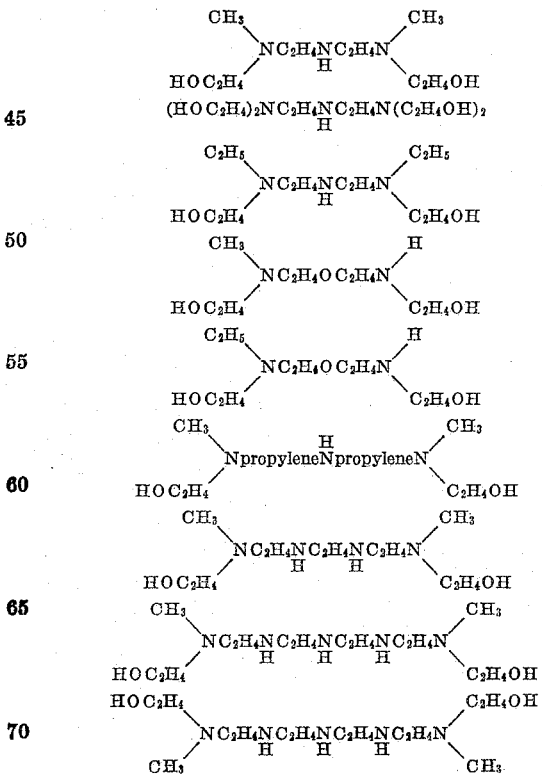

Another procedure for producing suitable polyamines is a reaction involving first an alkylene imine, such as ethylene imine or propylene imine, followed by an alkylene oxide, such as ethylene oxide, propylene oxide or glycide.

What has been said previously may be illustrated by reactions involving a secondary alkyl amine, or a secondary alicyclic amine, such as dibutylamine, dibenzylamine, dicyclohexylamine, or mixed amines with an imine so as to introduce a primary amino group which can be reacted with an alkylene oxide followed by reaction with an imine and then the use of an alkylene oxide again. Similarly, one can start with a primary amine and introduce two moles of an alkylene oxide so as to have a compound comparable to ethyl diethanolamine and react with two moles of an imine and then with two moles of ethylene oxide.

Reactions involving the same reactants previously described, i. e., a suitable secondary monoamine plus an alkylene imine plus an alkylene oxide, or a suitable monoamine plus an alkylene oxide plus an alkylene imine and plus the second introduction of an alkylene oxide, can be applied to a variety of primary amines. In the case of primary amines one can either employ two moles of an alkylene oxide so as to convert both amino hydrogen atoms into an alkanol group, or the equivalent; or else the primary amine can be converted into a secondary amine by the alkylation reaction. In any event, one can obtain a series of primary amines and corresponding secondary amines which are characterized by the fact that such amines include groups having repetitious ether linkages and thus introduce a definite hydrophile effect by virtue of the ether linkage. Suitable polyether amines susceptible to conversion in the manner described include those of the formula

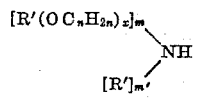

in which $x$ is a small whole number having a value of 1 or more, and may be as much as 10 or 12; $n$ is an integer having a value of 2 to 4, inclusive; $m$ represents the numeral 1 to 2; and $m'$ represents a number 0 to 1, with the proviso that the sum of $m$ plus $m'$ equals 2; and $R'$ has its prior significance, particularly as a hydrocarbon radical.

The preparation of such amines has been described in the literature and particularly in two United States patents, to wit, U. S. Nos. 2,325,514, dated July 27, 1943, to Hester, and 2,355,337, dated August 8, 1944, to Spence. The latter patent describes typical haloalkyl ethers such as CH₃OC₂H₄Cl

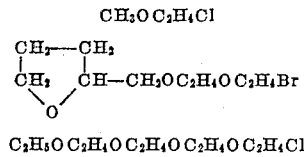

C₂H₅OC₂H₄OC₂H₄OC₂H₄OC₂H₄Cl

Such haloalkyl ethers can react with ammonia, or with a primary amine such as methylamine, ethylamine, cyclohexylamine etc., to produce a secondary amine of the kind above described, in which one of the groups attached to nitrogen is typified by $R'$. Such haloalkyl ethers also can be reacted with ammonia to give secondary amines as described in the first of the two patents mentioned immediately preceding. Monoamines so obtained and suitable for conversion into appropriate polyamines are exemplified by (CH₃OCH₂CH₂CH₂CH₂CH₂CH₂)₂NH Other similar secondary monoamines equally suitable for such conversion reactions in order to yield appropriate secondary amines, are those of the composition

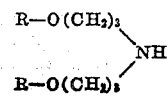

as described in U. S. Patent No. 2,375,659, dated May 8, 1945, to Jones et al. In the above formula R may be methyl, ethyl, propyl, amyl, octyl, etc.

Other suitable secondary amines which can be converted into appropriate polyamines can be obtained from products which are sold in the open market, such as may be obtained by alkylation of cyclohexylmethylamine or the alkylation of similar primary amines, or for that matter, amines of the kind described in U. S. Patent No. 2,482,546, dated September 20, 1949, to Kaszuba, provided there is no negative group or halogen attached to the phenolic nucleus. Examples include the following: beta-phenoxyethylamine, gamma-phenoxypropylamine, beta-phenoxy-alpha-methylethylamine, and beta-phenoxypropylamine.

Other secondary monoamines suitable for conversion into polyamines are the kind described in British Patent No. 456,517, and may be illustrated by

C₁₂H₂₅—O—CH₂—CH₂—O—CH₂—CH₂—NH—CH₃

In light of the various examples of polyamines which have been used for illustration it may be well to refer again to the fact that previously the amine was shown as

with the statement that such presentation is an oversimplification. It was pointed out that at least one occurrence of $R'$ must include a secondary amino radical of the kind specified. Actually, if the polyamine radical contains two or more secondary amino groups the amine may be reactive at two different positions and thus the same amine may yield compounds in which $R'$ and $R'$ are dissimilar.

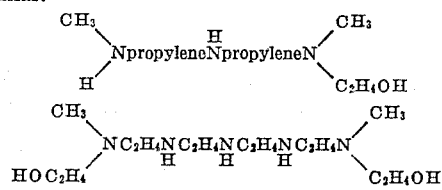

In the first of the two above formulas if the reaction involves a terminal amino hydrogen obviously the radicals attached to the nitrogen atom, which in turn combines with the methylene bridge, would be different than if the reaction took place at the intermediate secondary amino radical as differentiated from the terminal group. Again, referring to the second formula, above, although a terminal amino radical is not involved it is obvious again that one could obtain two different structures for the radicals attached to the nitrogen atom united to the methylene bridge depending on whether the reaction took place at either one of the two outer secondary amino groups, or at the central secondary amino group. If there are two points of reactivity towards formaldehyde as illustrated by the above examples it is obvious that one might get a mixture in which in part the reaction took place at one point and in part at another point. Indeed, there are well known suitable polyamine reactions where a large variety of compounds might be obtained due to such multiplicity of reactive radicals. This can be illustrated by the following formula:

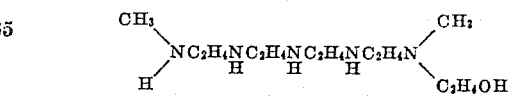

Certain hydroxylated polyamines which may be employed and which illustrate the appropriate type of reactant used for the instant condensation reaction may be illustrated by the following additional examples:

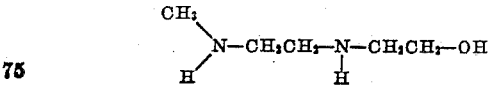

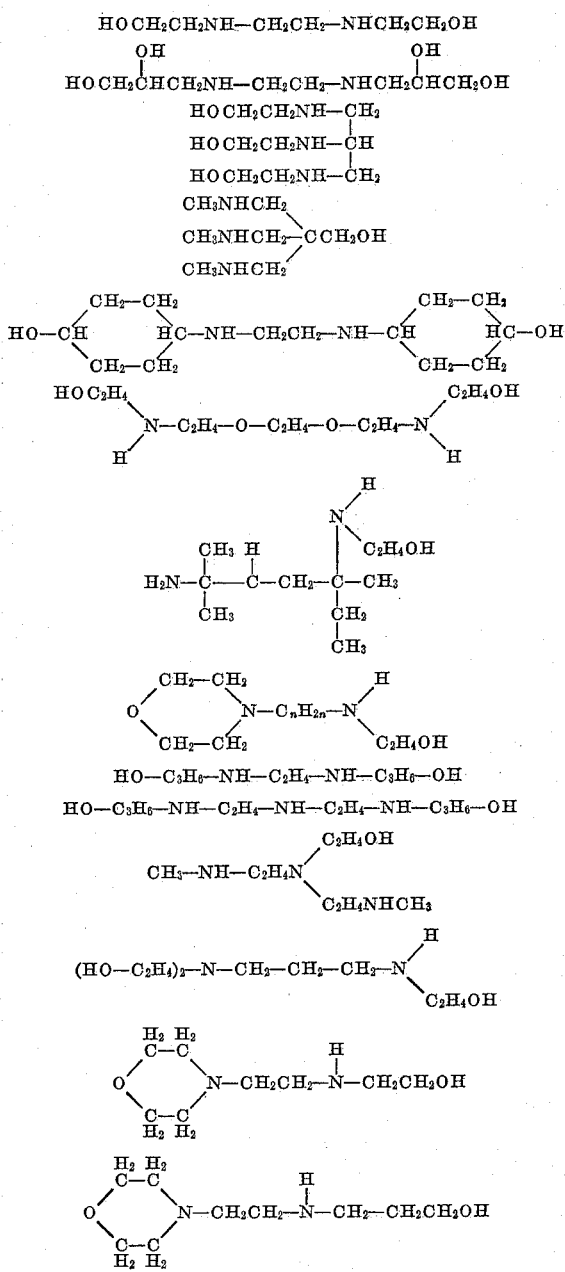

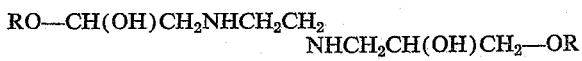

As is well known one can prepare ether amino alcohols of the type

RO—CH(OH)CH₂NHCH₂CH₂
NHCH₂CH(OH)CH₂—OR in which R represents an alkyl group varying from methyl to normal decyl, and in fact, the group may contain as many as 15, 20 or even 30 carbon atoms. See J. Org. Chem., 17, 2 (1952).

Over and above the specific examples which have appeared previously, attention is directed to the fact that a number of suitable amines are included in subsequent Table II.

PART 4

The acylation-susceptible intermediate products obtained by the herein described processes represent cogeneric mixtures which are the result of a condensation reaction or reactions. Since the resin molecule cannot be defined satisfactorily by formula, although it may be so illustrated in an idealized simplification, it is difficult to actually depict the final product of the cogeneric mixture except in terms of the process itself.

Previous reference has been made to the fact that the procedure herein employed is comparable, in a general way, to that which corresponds to somewhat similar derivatives made either from phenols as differentiated from a resin, or in the manufacture of a phenol-amine-aldehyde resin; or else from a particularly selected resin and an amine and formaldehyde in the manner desribed in Bruson Patent No. 2,031,557 in order to obtain a heat-reactive resin. Since the condensation products obtained are not heat-convertible and since manufacture is not restricted to a single phase system, and since temperatures up to 150° C. or thereabouts may be employed, it is obvious that the procedure becomes comparatively simple. Indeed, perhaps no description is necessary over and above what has been said previously, in light of subsequent examples. However, for purpose of clarity the following details are included.

A convenient piece of equiment for preparation of these cogeneric mixtures is a resin pot of the kind described in aforementioned U. S. Patent No. 2,499,368. In most instances the resin selected is not apt to be a fusible liquid at the early or low temperature stage of reaction if employed as subsequently described; in fact, usually it is apt to be a solid at distinctly higher temperatures, for instance, ordinary room temperature. Thus, I have found it convenient to use a solvent and particularly one which can be removed readily at a compartively moderate temperature, for instance, at 150° C. A suitable solvent is usually benzene, xylene, or a comparable petroleum hydrocarbon or a mixture of such or similar solvents. Indeed, resins which are not soluble except in oxygenated solvents or mixtures containing such solvents are not here included as raw materials. The reaction can be conducted in such a way that the initial reaction, and perhaps the bulk of the reaction, takes place in a polyphase system. However, if desirable, one can use an oxygenated solvent such as a low-boiling alcohol, including ethyl alcohol, methyl alcohol, etc. Higher alcohols can be used or one can use a comparatively non-volatile solvent such as dioxane or the diethylether of ethyleneglycol. One can also use a mixture of benzene or xylene and such oxygenated solvents. Note that the use of such oxygenated solvent is not required in the sense that it is not necessary to use an initial resin which is soluble only in any oxygenated solvent as just noted, and it is not necessary to have a single phase system for reaction.

Actually, water is apt to be present as a solvent for the reason that in most cases aqueous formaldehyde is employed, which may be the commercial product which is approximately 37%, or it may be diluted down to about 30% formaldehyde. However, paraformaldehyde can be used but it is more difficult perhaps to add a solid material instead of the liquid solution and, everything else being equal, the latter is apt to be more economical. In any event, water is present as water of reaction. If the solvent is completely removed at the end of the process, no problem is involved if the material is used for any subsequent reaction. However, if the reaction mass is going to be subjected to some further reaction where the solvent may be objectionable, as in the case of ethyl or hexyl alcohol, and if there is to be subsequent oxyalkylation, then, obviously, the alcohol should not be used or else it should be removed. The fact that an oxygenated solvent need not be employed, of course, is an advantage for reasons stated.

Another factor, as far as the selection of solvent goes, is whether or not the cogeneric mixture obtained at the end of the reaction is to be used as such or in the salt form. The cogeneric mixtures obtained are apt to be solids or thick viscous liquids in which there is some change from the initial resin itself, particularly if some of the initial solvent is apt to remain without complete removal. Even if one starts with a resin which is almost invariably a dark red in color or at least a red-amber or some color which includes both an amber component and a reddish component. By and large, the melting point is apt to be lower and the products may be more sticky and more tacky than the original resin itself. Depending on the resin selected and on the amine selected the condensation product or reaction mass on a solvent-free basis may be hard, resinous and comparable to the resin itself.

The products obtained, depending on the reactants selected, may be water-insoluble or water-dispersible, or water-soluble, or close to being water-soluble. Water solubility is enhanced, of course, by making a solution in the acidified vehicle such as a dilute solution, for instance, a 5% solution of hydrochloric acid, acetic acid, hydroxyacetic acid, etc. One also may convert the finished product into salts by simply adding a stoichiometric amount of any selected acid and removing any water present by refluxing with benzene or the like. In fact, the selection of the solvent employed may depend in part whether or not the product at the completion of the reaction is to be converted into a salt form.

In the next succeeding paragraph it is pointed out that frequently it is convenient to eliminate all solvent, using a temperature of not over 150° C. and employing vacuum, if required. This applies, of course, only to those circumstances where it is desirable or necessary to remove the solvent. Petroleum solvents, aromatic solvents, etc., can be used. The selection of solvent, such as benzene, xylene, or the like, depends primarily on cost, i. e., the use of the most economical solvent and also on three other factors, two of which have been previously mentioned; (a) is the solvent to remain in the reaction mass without removal? (b) is the reaction mass to be subjected to further reaction in which the solvent, for instance, an alcohol, either low boiling or high boiling, might interfere as in the case of oxyalkylation?; and the third factor is this, (c) is an effort to be made to purify the reaction mass by the usual procedure as, for example, a water-wash to remove any unreacted water-soluble polyamine, if employed and present after reaction? Such procedures are well known and, needless to say, certain solvents are more suitable than others. Everything else being equal, I have found xylene the most satisfactory solvent.

I have found no particular advantage in using a low temperature in the early stage of the reaction because, and for reasons explained, this is not necessary although it does apply in some other procedures that, in a general way, bear some similarity to the present procedure. There is no objection, of course, to giving the reaction an opportunity to proceed as far as it will at some low temperature, for instance, 30° to 40° but ultimately one must employ the higher temperature in order to obtain products of the kind herein described. If a lower temperature reaction is used initially the period is not critical, in fact, it may be anything from a few hours up to 24 hours. I have not found any case where it was necessary or even desirable to hold the low temperature stage for more than 24 hours. In fact, I am not convinced there is any advantage in holding it at this stage for more than 3 or 4 hours at the most. This, again, is a matter of convenience largely for one reason. In heating and stirring the reaction mass there is a tendency for formaldehyde to be lost. Thus, if the reaction can be conducted at a lower temperature so as to use up part of the formaldehyde at such lower temperature, then the amount of unreacted formaldehyde is decreased subsequently and makes it easier to prevent any loss. Here, again, this lower temperature is not necessary by virtue of heat convertibility as previously referred to.

If solvents and reactants are selected so that reactants and products of reaction are mutually soluble, then agitation is required only to the extent that it helps cooling or helps distribution of the incoming formaldehyde. This mutual solubility is not necessary as previously pointed out but may be convenient under certain circumstances. On the other hand, if the products are not mutually soluble then agitation should be more vigorous for the reason that reaction probably takes place principally at the interfaces and the more vigorous the agitation the more interfacial area. The general procedure employed is invariably the same when adding the resin and the selected solvent, such as benzene or xylene. Refluxing should be long enough to insure that the resin added, preferably in a powdered form, is completely soluble. However, if the resin is prepared as such it may be added in solution form, just as preparation is described in aforementioned U. S. Patent 2,499,368. After the resin is in complete solution the polyamine is added and stirred. Depending on the polyamine selected, it may or may not be soluble in the resin solution. If it is not soluble in the resin solution it may be soluble in the aqueous formaldehyde solution. If so, the resin then will dissolve in the formaldehyde solution as added, and if not, it is even possible that the initial reaction mass could be a three-phase system instead of a two-phase system although this would be extremely unusual. This solution, or mechanical mixture, if not completely soluble is cooled to at least the reaction temperature or somewhat below, for example 35° C. or slightly lower, provided this initial low temperature stage is employed. The formaldehyde is then added in a suitable form. For reasons pointed out I prefer to use a solution and whether to use a commercial 37% concentration is simply a matter of choice. In large scale manufacturing there may be some advantage in using a 30% solution of formaldehyde but apparently this is not true on a small laboratory scale or pilot plant scale. 30% formaldehyde may tend to decrease any formaldehyde loss or make it easier to control unreacted formaldehyde loss.

On a large scale if there is any difficulty with formaldehyde loss control, one can use a more dilute form of formaldehyde, for instance, a 30% solution. The reaction can be conducted in an autoclave and no attempt made to remove water until the reaction is over. Generally speaking, such a procedure is much less satisfactory for a number of reasons. For example, the reaction does not seem to go to completion, foaming takes place, and other mechanical or chemical difficulties are provided. I have found no advantage in using solid formaldehyde because even here water of reaction is formed.

Returning again to the preferred method of reaction and particularly from the standpoint of laboratory procedure employing a glass resin pot, when the reaction has proceeded as far as one can reasonably expect at a low temperature, for instance, after holding the reaction mass with or without stirring, depending on whether or not it is homogeneous, at 30° or 40° C., for 4 or 5 hours, or at the most, up to 10–24 hours, I then complete the reaction by raising the temperature up to 150° C., or thereabouts as required. The initial low temperature procedure can be eliminated or reduced to merely the shortest period of time which avoids loss of polyamine or formaldehyde. At a higher temperature I use a phase-separating trap and subject the mixture to reflux condensation until the water of reaction and the water of solution of the formaldehyde is eliminated. I then permit the temperature to rise to somewhere about 100° C., and generally slightly above 100° C., and below 150° C. by eliminating the solvent or part of the solvent so the reaction mass stays within this predetermined range. This period of heating and refluxing, after the water is eliminated, is continued until the reaction mass is homogeneous and then for one to three hours longer. The removal of the solvents is conducted in a conventional manner in the same way as the removal of solvents in resin manufacture as described in aforementioned U. S. Patent No. 2,499,368.

Needless to say, as far as the ratio of reactants goes I have invariably employed approximately one mole of the resin based on the molecular weight of the resin molecule, 2 moles of the secondary polyamine and 2 moles of formaldehyde. In some instances I have added a trace of caustic as an added catalyst but have found no particular advantage in this. In other cases I have used a slight excess of formaldehyde and, again, have not found any particular advantage in this. In other cases I have used a slight excess of amine and, again, have not found any particular advantage in so doing. Whenever feasible I have checked the completeness of reaction in the usual ways, including the amount of water of reaction, molecular weight, and particularly in some instances have checked whether or not the end-product showed surface-activity, particularly in a dilute acetic acid solution. The nitrogen content after removal of unreacted polyamine, if any is present, is another index.

In light of what has been said previously little more need be said as to the actual procedure employed for the preparation of the herein described condensation products. The following example will serve by way of illustration:

Example 1b

The phenol-aldehyde resin is the one that has been identified previously as Example 2a. It was obtained from a para-tertiary butylphenol and formaldehyde. The resin was prepared using an acid catalyst which was completely neutralized at the end of the reaction. The molecular weight of the resin was 882.5. This corresponded to an average of about 3½ phenolic nuclei as the value for $n$ which excludes the 2 external nuclei, i. e., the resin was largely a mixture having 3 nuclei and 4 nuclei, excluding the 2 external nuclei, or 5 and 6 overall nuclei. The resin so obtained in a neutral stage had a light amber color.

882 grams of the resin identified as 2a preceding, were powdered and mixed with a considerably lesser weight of xylene, to wit, 500 grams. The mixture was refluxed until solution was complete. It was then adjusted to approximately 33° to 38° C., and 296 grams of symmetrical di(hydroxyethyl)ethylenediamine were added. The mixture was stirred vigorously and formaldehyde used was a 30% solution and the amount employed was 200 grams. It was added in a little over 3 hours. The mixture was stirred vigorously and kept within a temperature range of 33° to 48° C. for about 17 hours. At the end of this time it was refluxed using a phase-separating trap and a small amount of aqueous distillate withdrawn from time to time. The presence of formaldehyde was noted. Any unreacted formaldehyde seemed to disappear within about 3 hours or thereabouts. As soon as the odor of formaldehyde was no longer particularly noticeable or detectible the phase-separating trap was set so as to eliminate part of the xylene which was removed until the temperature reached approximately 150° C. or perhaps a little higher. The reaction mass was kept at this temperature for a little over 4 hours and the reaction stopped. During this time any additional water, which was probably water of reaction which had formed, was eliminated by means of the trap. The residual xylene was permitted to stay in the cogeneric mixture. A small amount of the sample was heated on a water bath to remove the excess xylene. The residual material was dark red in color and had the consistency of a sticky fluid or tacky resin. The overall time for reaction was somewhat under 30 hours. In other examples it varied from 24 to more than 36 hours. The time can be reduced by cutting the low temperature period to approximately 3 to 6 hours. Note that in Table IV following there are a large number of added examples illustrating the same procedure. In each case the initial mixture was stirred and held at a fairly low temperature (30° to 40° C.) for a period of several hours. Then refluxing was employed until the odor of formaldehyde disappeared. After the odor of formaldehyde disappeared the phase-separating trap was employed to separate out all the water, both the solution and condensation. After all the water had been separated enough xylene was taken out to have the final product reflux for several hours somewhere in the range of 145° to 150° C., or thereabouts. Usually the mixture yielded a clear solution by the time the bulk of the water, or all of the water, had been removed.

Note that as pointed out previously, this procedure is illustrated by 24 examples in Table II.

TABLE II

| Ex. No. | Resin used | Amt., grs. | Amine used and amount | Strength of formaldehyde soln. and amt. | Solvent used and amt. | Reaction temp., °C. | Reaction time, hrs. | Max. distill. temp., °C. |
|---|---|---|---|---|---|---|---|---|
| 1b | 2a | 882 | Amine A, 296 g | 30%, 200 g | Xylene, 500 g | 21-24 | 24 | 150 |
| 2b | 5a | 480 | Amine A, 148 g | 37% 81g | Xylene, 480 g | 20-23 | 27 | 156 |
| 3b | 10a | 633 | ___do___ | ___do___ | Xylene, 610 g | 22-27 | 25 | 142 |
| 4b | 2a | 441 | Amine B, 176 g | 30%, 100 g | Xylene, 300 g | 20-25 | 28 | 145 |
| 5b | 5a | 480 | ___do___ | 37%, 81 g | Xylene, 425 g | 23-27 | 34 | 150 |
| 6b | 10a | 633 | ___do___ | 30%, 100 g | Xylene, 500 g | 25-27 | 30 | 152 |
| 7b | 2a | 882 | Amine C, 324 g | 37%, 162 g | Xylene, 625 g | 23-26 | 38 | 141 |
| 8b | 5a | 480 | Amine C, 162 g | 30%, 100 g | Xylene, 315 g | 20-21 | 25 | 143 |
| 9b | 10a | 633 | ___do___ | ___do___ | Xylene, 535 g | 23-24 | 25 | 140 |
| 10b | 13a | 473 | Amine D, 256 g | ___do___ | Xylene, 425 g | 22-25 | 25 | 148 |
| 11b | 14a | 511 | ___do___ | ___do___ | Xylene, 450 g | 20-21 | 25 | 158 |
| 12b | 15a | 665 | ___do___ | ___do___ | Xylene, 525 g | 21-25 | 28 | 152 |
| 13b | 2a | 441 | Amine E, 208 g | 37%, 81 g | Xylene, 400 g | 22-24 | 26 | 143 |
| 14b | 5a | 480 | ___do___ | ___do___ | ___do___ | 25-27 | 36 | 144 |
| 15b | 9a | 595 | ___do___ | ___do___ | Xylene, 500 g | 26-27 | 34 | 141 |
| 16b | 2a | 441 | Amine F, 236 g | ___do___ | Xylene, 400 g | 21-23 | 25 | 153 |
| 17b | 5a | 480 | ___do___ | ___do___ | ___do___ | 20-22 | 28 | 150 |
| 18b | 14a | 511 | ___do___ | ___do___ | Xylene, 500 g | 23-25 | 27 | 155 |
| 19b | 22a | 498 | Amine G, 172 g | ___do___ | Xylene, 400 g | 20-21 | 34 | 150 |
| 20b | 23a | 542 | ___do___ | ___do___ | Xylene, 450 g | 20-24 | 36 | 152 |
| 21b | 25a | 547 | Amine H, 221 g | ___do___ | Xylene, 500 g | 20-22 | 30 | 148 |
| 22b | 2a | 441 | ___do___ | ___do___ | Xylene, 400 g | 20-29 | 24 | 143 |
| 23b | 26a | 595 | Amine I, 172 g | ___do___ | Xylene, 450 g | 20-22 | 32 | 151 |
| 24b | 27a | 391 | Amine I, 86 g | 30%, 50 g | Xylene, 300 g | 20-26 | 36 | 147 |

As to the formulas of the above amines referred to as Amine A through Amine I, inclusive, see immediately following:

Amine A—

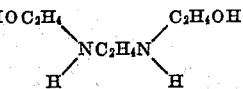

Amine B—

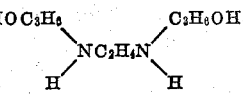

Amine C—

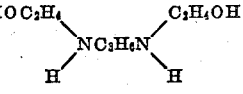

Amine D—

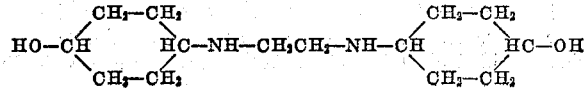

Amine E— 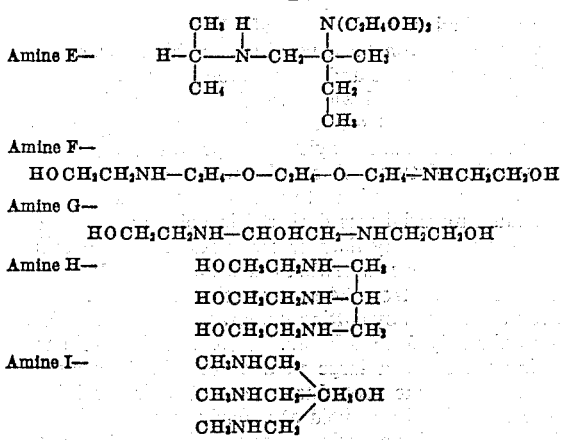

Amine F—
HOCH₂CH₂NH—C₂H₄—O—C₂H₄—O—C₂H₄—NHCH₂CH₂OH

Amine G—
HOCH₂CH₂NH—CHOHCH₂—NHCH₂CH₂OH

Amine H—
HOCH₂CH₂NH—CH₂
HOCH₂CH₂NH—CH
HOCH₂CH₂NH—CH₂

Amine I—
CH₂NHCH₃
CH₂NHCH₂—CH₂OH
CH₂NHCH₃

PART 5

Needless to say, the two prior reactants can be combined readily by means of an acylation reaction, i. e., either amidification or esterification. Assuming there is no residual amino hydrogen atom present in the particular reactant selected and described in Part 4, obviously acylation is limited to esterification. Assuming that there is a residual amino hydrogen atom present amidification probably takes place preferentially and under other circumstances both amidification and esterification can take place.

It has been pointed out that the amine-modified condensate must have under any condition at least two alkanol hydroxy groups and may have more, for instance, 3, 4, 5, or 6.

It is to be noted the carboxylated resins may be monofunctional, difunctional or even may contain 3 or more carboxyls. For practical purposes the preferred resin contains one or two carboxyl groups. A carboxylated resin having one carboxyl group may be reacted with a suitable amine-modified resin so as to combine only one such carboxylated resin molecule. Similarly, the amine-modified resin molecule may combine with at least two such monocarboxylated resin molecules. In some instances as, for example when derived from

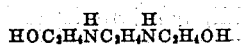

or

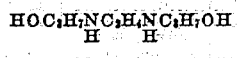

the amine-modified resin may be combined with as many as 4 or perhaps as many as 6 monocarboxylated resin units.

When the carboxylated resin contains more than one carboxyl group, for instance, two carboxyl groups, the same combinations as above indicated may take place but in addition there may be formed linear polymers and also polymers showing cross-linking, at least to some modest degree. Modest cross-linking is not objectionable provided the resultant product is still soluble in an organic solvent and is thermoplastic. The objective is to obtain a product which, regardless of its other uses, is readily susceptible to oxyalkylation. Thus, soluble complicated resins have been obtained using dicarboxylated resins and compounds obtained from dialkanolamines in which structures other than linear polymer structure appears.

The reaction involving the carboxylated resin is acylation, broadly speaking, and essentially esterification but amidification may be involved. For practical purposes the simplest phase of the reaction may be illustrated by the reactions described in my co-pending application, Serial No. 388,051, filed October 23, 1953. In this instance the reaction between the carboxylated resins and amine-modified phenol-aldehyde resins is concerned with those in which the ratio of resin molecule to amine molecule to formaldehyde is 1:2:2.

In two co-pending applications, Serial Nos. 388,051, and 388,052, filed October 23, 1953, where the simpler condensate is described particularly in reaction with a carboxylated resin it is obvious that acylation is limited to esterification. What was said therein is as follows:

"Returning to the over-simplified presentation of the amine-modified resin and particularly one obtained from diethanolamine, for example, or for that matter from ethylethanolamine, the product would be illustrated thus:

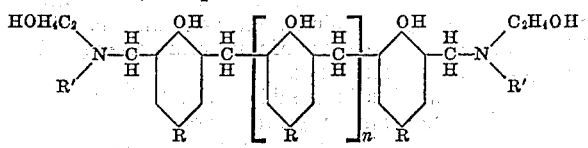

in which R' is alkyl or alkanol."

There has been presented earlier an idealized formula for the carboxylated resin. The terminal part of the molecule may be shown thus

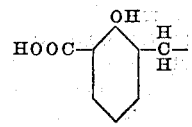

Since the hydroxylated polyamines may or may not contain two amino hydrogen atoms or even more as exemplified by the following three reactants:

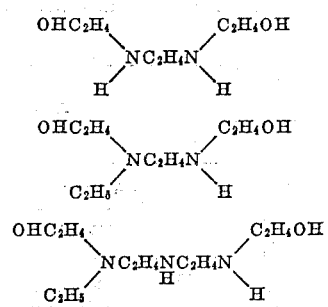

it becomes obvious esterification may enter into the reaction, or amidification when combination takes place with the carboxylated resin. Amidification and esterification may both be involved if the reactant is comparable to the third polyamine above illustrated. The cheapest hydroxylated amine available in the market is the first of the three compounds depicted above.

Without attempting to include all the ramifications and particularly where the amine radical is hydroxylated and there is no amino hydrogen left after condensation as in the second of the above formulas just presented, the esterification reaction with the formation of an ester linkage may be shown thus:

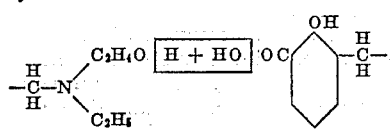

It goes without saying that esterification may involve the ethanol group attached to nitrogen which, in turn, is attached to an ethylene bridge. It does not appear necessary to illustrate amidification or the formation of esteramides for reason that the analogous reactions will be obvious.

The compounds can be prepared without the use of any solvent although for obvious reasons it is preferable that a solvent be used. Indeed, it is specified that the resins employed be xylene-soluble. In every instance xylene was used as a solvent but obviously any other comparable solvent such as ethylbenzene, cymene, or the like, can be employed. However, xylene seems to be very suitable.

The general procedure was to dissolve the carboxylated resin in xylene as indicated and then add the amine-modified resin using a reflux condenser with a phase-separating trap. The reaction was conducted for a period of time at a comparatively low temperature, for instance somewhere above the boiling point of water, and then gradually was taken to a higher temperature, for instance, 140° C. to 150° C. There were two reasons for this procedure. An effort was made to limit the reaction as far as possible to the acylation (esterification) and to avoid more complicated reactions such as possible ring formation and the like. Secondly, the effort was made in all instances to avoid gelation or cross-linking so as to yield an insoluble product. If the resultant of reaction became thick and showed incipient cross-linking the reaction was stopped provided the theoretical amount of water, or approximately the theoretical amount, had been eliminated. If there happened to be no danger of cross-linking or ring formation in light of the particular reactants selected, any suitable temperature could be employed.

Water of reaction as formed was eliminated by means of the phase-separating trap and if required the xylene or other solvent employed was eliminated so as to raise the temperature sufficiently high to eliminate the theoretical water of esterification or amidification or approximately this amount.

It is not necessary that esterification eliminate all carboxyl radicals or all hydroxyl radicals. Thus, in the use of a carboxylated resin having 2 or more carboxyl radicals if desired the reaction may be conducted so that only one carboxyl radical is reacted. Thus, the residual product may have a free carboxyl radical, or a free carboxyl radical and a free hydroxyl radical. In such instances where all the carboxyl radicals are esterified there may be free hydroxyl radicals, or even where only one carboxyl group is reacted. Amino hydrogen atoms may remain unreacted.

The entire procedure is conventional and, in fact, has been described in the formation of other esters or amides or acylated products using carboxylated resins.

Example 1c

The carboxylated resin employed was 4aa. The amine-modified resin employed was 1b. The molecular weight of carboxylated resin 4aa was 846. A gram mole of the resin, to wit, 846 grams were reacted with 1202 grams of the amine-modified resin (xylene-free basis). The amount of xylene present both as a solvent for the two reactants and as added solvent was 1100 grams. The mixture started to reflux at a little over 100° C. and rose rapidly to about 125° C. Xylene was then withdrawn until a temperature of about 162° C. was reached. The mixture was allowed to reflux at this temperature for approximately 6 hours during which time period 18 grams of water were eliminated. The reaction was stopped and the xylene which had been withdrawn during the reflux period was returned to the reaction mass.

This example and other examples are presented in Table III following.

TABLE III

| Ex. No. | Carboxylated resin Ex. No. | Mol. ratio | Mol. Wt. | Amt. used, grams | Amine modified resin | Wt. of amine modified resin (xylene-free basis), grams | Solvent (xylene) at start, grams | Time, hrs. | Max. temp., °C. | Water out, ml. |
|---|---|---|---|---|---|---|---|---|---|---|
| 1c | 4aa | 1:1 | 846 | 846 | 1b | 1,202 | 1,100 | 6.0 | 162 | 18 |
| 2c | 4aa | 1:2 | 846 | 846 | 1b | 2,404 | 2,100 | 6.0 | 159 | 36 |
| 3c | 4aa | 1:1 | 846 | 846 | 2b | 1,280 | 1,100 | 5.0 | 160 | 18 |
| 4c | 4aa | 1:2 | 846 | 846 | 2b | 2,560 | 2,100 | 5.5 | 173 | 36 |
| 5c | 4aa | 1:1 | 846 | 846 | 3b | 1,587 | 1,350 | 5.5 | 165 | 18 |
| 6c | 4aa | 1:2 | 846 | 846 | 3b | 3,174 | 1,350 | 7.0 | 163 | 36 |
| 7c | 4aa | 1:1 | 846 | 846 | 4b | 1,258 | 1,125 | 8.0 | 166 | 18 |
| 8c | 4aa | 1:2 | 846 | 846 | 4b | 2,516 | 2,125 | 6.0 | 172 | 36 |
| 9c | 4aa | 1:1 | 846 | 846 | 5b | 1,336 | 1,200 | 8.0 | 170 | 18 |
| 10c | 4aa | 1:2 | 846 | 846 | 5b | 2,672 | 2,200 | 6.5 | 166 | 36 |
| 11c | 3aa | 1:1 | 872 | 872 | 6b | 1,336 | 1,100 | 7.5 | 163 | 18 |
| 12c | 3aa | 1:1 | 872 | 872 | 6b | 1,643 | 1,400 | 4.5 | 158 | 18 |
| 13c | 3aa | 1:1 | 872 | 872 | 1b | 1,202 | 1,100 | 4.5 | 170 | 18 |
| 14c | 6aa | 1:1 | 972 | 972 | 2b | 1,280 | 1,140 | 5.5 | 166 | 18 |
| 15c | 6aa | 1:1 | 972 | 972 | 3b | 1,587 | 1,385 | 6.0 | 168 | 18 |
| 16c | 6aa | 1:1 | 972 | 972 | 5b | 1,336 | 1,200 | 6.5 | 159 | 18 |
| 17c | 2aa | 1:2 | 1,014 | 1,014 | 1b | 2,404 | 1,100 | 6.5 | 160 | 36 |
| 18c | 2aa | 1:2 | 1,014 | 1,014 | 2b | 2,510 | 2,200 | 7.0 | 173 | 36 |
| 19c | 2aa | 1:2 | 1,014 | 1,014 | 3b | 3,174 | 2,400 | 7.0 | 172 | 36 |
| 20c | 4aa | 1:1 | 846 | 846 | 1b | 1,202 | 1,100 | 8.5 | 174 | 36 |
| 21c | 4aa | 1:1 | 846 | 846 | 2b | 1,280 | 1,105 | 9.0 | 160 | 36 |
| 22c | 4aa | 1:1 | 846 | 846 | 3b | 1,587 | 1,375 | 10.0 | 158 | 36 |
| 23c | 4aa | 1:1 | 846 | 846 | 4b | 1,258 | 1,100 | 12.0 | 166 | 36 |
| 24c | 4aa | 1:1 | 846 | 846 | 5b | 1,336 | 1,150 | 11.0 | 158 | 36 |
| 25c | 4aa | 1:1 | 846 | 846 | 6b | 1,643 | 1,425 | 11.0 | 166 | 36 |

Note that in the last six examples a mole of dicarboxylated resin was reacted mole-for-mole with a polyhydroxylated amine-modified resin. The reaction was continued in an effort to produce a linear polymer, to wit, to esterify both carboxyls of the carboxylated resin. The reaction probably ended with free hydroxyl groups and perhaps a structure more complicated, at least to some degree than a simple linear polymer. Note the ratio for example of reactants in 20c is identical with that in 1c but in 20c the amount of water eliminated was approximately 36 grams as compared with 18 grams in 1c. Instead of free hydroxyl groups, there may remain instead, radicals having an amino hydrogen atom.

PART 6

The products obtained as described may be used for various purposes in which surface-active agents may be employed. When combined with acids such as hydroxy acid, lactic acid, gluconic acid, or the like, the salts show increased hydrophile properties. When combined with higher fatty acids, high molal monosulfonic acids such as mahogany acids, the products show increased hydrophobe effect. These compounds as such, or in salt form, may be employed as additives to demulsifying agents.

The products are particularly valuable as additives for demulsifying agents employed in conjunction with concentrated hydrochloric acid. They may be used as corrosion inhibitors or rust preventives, particularly in combination with chromium compounds as described in U. S. Patent No. 2,450,807, dated October 5, 1948, to McCarthy.

They may be used as anti-stripping agents in connection with asphalt.

In some instances they are effective for the resolution of petroleum emulsions of the oil-in-water type.

The most important use, however, as far as I am aware, is as an intermediate.

The above products can be subjected to oxyalkylation, particularly with an alkylene oxide having not over 4 carbon atoms such as ethylene oxide, butylene oxide, propylene oxide, glycide, methylglycide, etc., to produce a variety of materials, some of which are extremely hydrophile, others which show hydrophile-hydrophobe balance, particularly if ethylene oxide is used in combination with butylene oxide or propylene oxide. The compounds so obtained are extremely useful for the resolution of petroleum emulsions of the water-in-oil type. All that is required is to follow the procedure set forth in U. S. Patent No. 2,636,038, dated April 21, 1953, to Brandner.

The compounds herein described can be reacted with diepoxides so as to form a more complex molecule and then reacted with monoepoxides as above described to give additional products useful for various purposes and particularly the resolution of petroleum emulsions of the water-in-oil type.

The increased basicity in derivatives of the kind described where a polyamine is used instead of a monoamine may result in products having increased hydrophile character. This does not necessarily apply in instances where there are only two basic nitrogen atoms and one such basic nitrogen atom is a secondary amine group which is susceptible to amidification and enters into such reaction, and thus loses its basicity. In any event, however, some of the products produced in the manner herein described are effective for the resolution of water-in-oil emulsions without any further treatment or only with the formation of a salt by combination with the acids indicated previously. Their value need not be limited to their use as additives as above mentioned, in the instant part. In other words, they may not require oxyalkylation, particularly oxyethylation, oxypropylation or a combination of oxides which introduce hydrophile groups. Indeed, some excellent demulsifiers have been obtained where the products are so produced without even involving salt formation.

Having thus described my invention what I claim as new and desire to secure by Letters Patent is:

1. An acylation process comprising reacting (A) a carboxylated phenol-aldehyde resin, and (B) an amine-modified phenol-aldehyde resin in a molar ratio of carboxylated resin to amine-modified resin of 1 to 6:1; said carboxylated resin (A) being a fusible, carboxy-containing, xylene-soluble, water-insoluble, low-stage phenol-aldehyde resin; said resin being derived by reaction between a mixture of a difunctional monohydric hydrocarbon-substituted phenol and salicylic acid on the one hand, and an aldehyde having not over 8 carbon atoms and having one functional group reactive toward both components of the mixture on the other hand; the amount of salicylic acid employed in relation to the non-carboxylated phenol being sufficient to contribute at least one salicylic acid radical per resin molecule and the amount of difunctional monohydric hydrocarbon-substituted phenol being sufficient to contribute at least one difunctional monohydric hydrocarbon-substituted phenol radical per molecule; said resin being formed in the substantial absence of phenols of functionality greater than two; and said phenol being of the formula

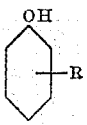

in which R is a hydrocarbon radical having at least 4 and not more than 14 carbon atoms and substituted in one of the positions ortho and para; said amine-modified phenol aldehyde resin (B) having at least 2 alkanol hydroxyl groups and being the product obtained by the process of condensing (a) an oxyalkylation-susceptible, fusible, non-oxygenated organic solvent-soluble, water-insoluble, low-stage phenol-aldehyde resin having an average molecular weight corresponding to at least 3 and not over 6 phenolic nuclei per resin molecule; said resin being difunctional only in regard to methylol forming reactivity; said resin being derived by reaction between a difunctional monohydric phenol and an aldehyde having not over 8 carbon atoms and reactive toward said phenol; said resin being formed in the substantial absence of phenols of functionality greater than 2; said phenol being of the formula

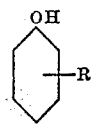

in which R is an aliphatic hydrocarbon radical having at least 4 and not more than 24 carbon atoms and substituted in the 2,4,6 position; (b) a basic hydroxylated secondary polyamine having not more than 32 carbon atoms in any group attached to the amino nitrogen atom, and (c) formaldehyde; said condensation reaction being conducted at a temperature sufficiently high to eliminate water and below the pyrolytic point of the reactants and resultants of reaction; with the further proviso that the molar ratio of reactants (c) (b) and (a) be 2,2 and approximately 1, respectively; with the added proviso that the resinous condensation product resulting from the process be heat-stable oxyalkylation-susceptible and contain at least two alkanol radicals; and with the final proviso that the product of acylation be thermoplastic and organic solvent-soluble.

2. The process of claim 1 with the proviso that the carboxylated resin molecule have approximately 5 phenolic nuclei of which not over 2 are obtained from salicylic acid.

3. The process of claim 1 with the proviso that the carboxylated resin molecule have approximately 5 phenolic nuclei of which 2 are obtained from salicylic acid.

4. The process of claim 1 with the proviso that the carboxylated resin molecule have approximately 5 phenolic nuclei of which 2 are obtained from salicylic acid and with the further proviso that the molal ratio of amine-modified resin to carboxylated resin be 1 to 1.

5. The process of claim 1 with the proviso that the carboxylated resin molecule have approximately 5 phenolic nuclei of which 2 are obtained from salicylic acid and with the further proviso that the molal ratio of amine-modified resin to carbonxylated resin be 1 to 1, and said amine-modified phenol-aldehyde resin condensate be obtained from a dialkanolpolyamine.

6. The process of claim 1 with the proviso that the carboxylated resin molecule have approximately 5 phenolic nuclei of which 2 are obtained from salicylic acid and with the further provision that the molal ratio of amine-modified resin to carboxylated resin be 1 to 1, and said amine-modified phenol-aldehyde resin condensate be obtained from a dialkanolpolyamine having not over 6 carbon atoms in the alkanol group.

7. The process of claim 1 with the provisio that the carboxylated resin molecule have approximately 5 phenolic nuclei of which 2 are obtained from salicylic acid and with the further proviso that the molal ratio of amine-modified resin to carboxylated resin be 1 to 1, and said amine-modified resin be obtained by use of symmetrical di-(hydroxyethyl) ethylene diamine as a reactant.

8. The process of claim 1 with the proviso that the carboxylated resin molecule have approximately 5 phenolic nuclei of which 2 are obtained from salicylic acid and with the further proviso that the molal ratio of amine-modified resin to carboxylated resin be 1 to 1; and said amine-modified resin be obtained by use of symmetrical di(hydroxypropyl) ethylene diamine as a reactant.

9. The process of claim 1 with the proviso that the carboxylated resin molecule have approximately 5 phenolic nuclei of which 2 are obtained from salicylic acid and with the further proviso that the molal ratio of amine-modified resin to carboxylated resin be 1 to 1, and said amine-modified resin be obtained by use of symmetrical di(hydroxybutyl) ethylene diamine as a reactant.

10. The process of claim 1 with the proviso that the carboxylated resin molecule have approximately 5 phenolic nuclei of which 2 are obtained from salicylic acid and with the further proviso that the molal ratio of amine-modified resin to carboxylated resin be 1 to 1, and said amine-modified resin be obtained by use of symmetrical di(hydroxyhexyl) ethylene diamine as a reactant.

11. The product obtained by the manufacturing process defined in claim 1.

12. The product obtained by the manufacturing process defined in claim 2.

13. The product obtained by the manufacturing process defined in claim 3.

14. The product obtained by the manufacturing process defined in claim 4.

15. The product obtained by the manufacturing process defined in claim 5.

16. The product obtained by the manufacturing process defined in claim 6.

17. The product obtained by the manufacturing process defined in claim 7.

18. The product obtained by the manufacturing process defined in claim 8.

19. The product obtained by the manufacturing process defined in claim 9.

20. The product obtained by the manufacturing process defined in claim 10.

References Cited in the file of this patent

UNITED STATES PATENTS

| | | |
|---|---|---|
| 2,571,120 | De Groote et al. | Oct. 16, 1951 |
| 2,679,487 | De Groote | May 25, 1954 |